United States Patent
Kamath et al.

(10) Patent No.: US 9,148,053 B2
(45) Date of Patent: Sep. 29, 2015

(54) FLUX SATURATION CONTROLLER

(71) Applicant: Hypertherm, Inc., Hanover, NH (US)

(72) Inventors: Girish R. Kamath, Lebanon, NH (US); Norm LeBlanc, Claremont, NH (US); Paul Tillman, Ascutney, VT (US); Wayne Chin, Etna, NH (US)

(73) Assignee: Hypertherm, Inc., Hanover, NH (US)

( * ) Notice: Subject to any disclaimer, the term of this patent is extended or adjusted under 35 U.S.C. 154(b) by 145 days.

(21) Appl. No.: 13/860,317

(22) Filed: Apr. 10, 2013

(65) Prior Publication Data

US 2013/0265805 A1  Oct. 10, 2013

Related U.S. Application Data

(60) Provisional application No. 61/622,139, filed on Apr. 10, 2012.

(51) Int. Cl.
*H02M 3/155* (2006.01)
*H02M 3/337* (2006.01)
*H02M 1/40* (2007.01)

(52) U.S. Cl.
CPC .............. *H02M 3/155* (2013.01); *H02M 3/337* (2013.01); *H02M 1/40* (2013.01)

(58) Field of Classification Search
CPC ...... H02M 3/3378; H02M 3/00; H02M 7/122
USPC ......... 363/20, 21.02, 21.07, 21.08, 21.14, 25, 363/37, 56.08, 65, 75, 95; 323/222, 207, 323/244, 284, 290; 219/110, 114, 130.32

See application file for complete search history.

(56) References Cited

U.S. PATENT DOCUMENTS

| | | | | |
|---|---|---|---|---|
| 4,127,894 A * | 11/1978 | Bishop et al. | ............... | 363/56.06 |
| 4,404,623 A | 9/1983 | Jourdan | | |
| 4,439,822 A * | 3/1984 | Cocconi | ..................... | 363/56.08 |
| 5,844,193 A * | 12/1998 | Nomura et al. | ................ | 219/110 |
| 5,944,193 A * | 8/1999 | Shimizu | .......................... | 206/710 |
| 6,365,868 B1 | 4/2002 | Borowy et al. | | |
| 7,859,869 B2 * | 12/2010 | Mayell | .......................... | 363/56.01 |
| 8,693,215 B2 * | 4/2014 | Coley et al. | ................. | 363/21.04 |

OTHER PUBLICATIONS

Ben-Yaakov, S., et al, "Spice Compatible Model of Self-Oscillating Converter," published at $23^{rd}$ IEEE Israel Convention, 2004, pp. 342-345.

Kamath, G.R., "Simple Control Method Tames Flux Saturation in High-Frequency Transformer-Link Full-Bridge DC-DC Converters," How2Power Today, Your Power Design Newsletter, Issue: Jun. 2012, pp. 1-6.

(Continued)

*Primary Examiner* — Rajnikant Patel
(74) *Attorney, Agent, or Firm* — Proskauer Rose LLP

(57) ABSTRACT

Transformer flux is monitored to determine if an onset of flux saturation is detected. If flux saturation is not detected, the transformer drive signal is received to a switch that maintains the polarity of the transformer flux. If flux saturation is detected, the transformer drive signal is received by a switch that reverses the polarity of the transformer signal and the transformer flux. This reversal of flux polarity can occur multiple times, during the carrier cycle of the drive signal, without compromising the dynamics of the transformer main control loop or requiring the drive signal to be regenerated.

19 Claims, 6 Drawing Sheets

(56) References Cited

OTHER PUBLICATIONS

Mohan, N., et al., "Chapter 8, Switch-Mode dc-ac Invertors: dc ↔ Sinusoidal ac," Power Electronics, Converters, Applications and Design, Second Edition, 1995, pp. 200-248.

Mohan, N., et al., "Chapter 10, Switching dc Power Supplies," Power Electronics, Converters, Applications and Design, Second Edition, 1995, pp. 301-353.

Mohan, N., et al. "Chapter 13, dc Motor Drives," Power Electronics, Converters, Applications and Design, Second Edition, 1995, pp. 377-398.

Mohan, N., et al., "Chapter 18, Optimizing the Utility Interface with Power Electronic Systems," Power Electronics, Converters, Applications and Design, Second Edition, 1995, pp. 483-504.

Tajfar, A., et al., "A Transformer-Flux-Balance Controller for a High-Frequency-Link Inverter with Applications for Solid-State Transformer, Renewable/Alternative Energy Sources, Energy Storage, and Electric Vehicles," IEEE ESTS Conference 2011, pp. 121-126.

Ferroxcube, http://www.ferroxcube.com, last viewed May 13, 2013, one page.

* cited by examiner

FLUX SATURATION CONTROLLER

RELATED APPLICATIONS

This application claims the benefit of and priority to U.S. Provisional Application No. 61/622,139, filed Apr. 10, 2012, the entire teachings of which are incorporated herein by reference.

FIELD OF THE INVENTION

The invention relates to high frequency transformer link converters and methods for controlling transformer flux saturation.

BACKGROUND

High-frequency transformers (e.g., high frequency link full-bridge DC-DC converter systems, transformers used in plasma cutting applications, etc.) can be used to provide electric power to various electronic systems and equipment. These transformers are often prone to transformer flux saturation, which can result in transformer overheating, and shutdown or catastrophic failure of a system utilizing the transformer. For example, in plasma cutting applications, transformer flux saturation can result in unexpected system failure and stoppage of the plasma cutting operation.

Flux saturation in a transformer can be caused by a number of factors, such as unequal switch duty-cycle ratios, gate-drive circuit time delays, switch transient time tolerances, and unequal switch voltage drops. Flux saturation can also occur due to dynamic changes in switch duty-cycle ratios, such changes that can occur during unit startup and line or load disturbances.

SUMMARY

Some embodiments of the present invention relate to a high frequency transformer link converter. The high frequency transformer link converter includes a high frequency transformer, a primary controller that provides a drive signal to the high frequency transformer, at least two switch devices that receive the drive signal within the high frequency transformer, and a transformer flux controller. At least one of the switch devices can reverse the polarity of transformer flux or transformer voltage. The transformer flux controller is coupled with the switch devices and can direct the switch devices to maintain or reverse the polarity of the transformer flux. The transformer flux controller is uncoupled from the primary controller, operating independent of the drive signal provided by the primary controller.

Some embodiments feature a method for controlling flux saturation in a high frequency transformer. The method involves providing a primary drive signal to the transformer, monitoring flux saturation in the transformer, and maintaining flux polarity in the transformer, until an onset of flux saturation is detected. Flux polarity can be maintained in the transformer by activating a switch that maintains the polarity of transformer flux as it receives the drive signal within the transformer.

Some embodiments of the present invention relate to a flux saturation controller. The flux saturation controller includes a switch that is electrically connected to a primary controller of a high frequency transformer and a flux saturation monitor that is electrically connected to the switch. The switch receives a drive signal, provided by the primary controller, within the high frequency transformer, and maintains or reverses flux polarity of the high frequency transformer. The flux saturation controller monitors the high frequency transformer to determine if an onset of flux saturation in the transformer is detected and directs the switch to maintain or reverse the flux polarity of the high frequency transformer.

In other examples, any of the aspects above, or any apparatus or method described herein, can include one or more of the following features.

The high frequency transformer can be coupled to at least one of a thermal processing unit, a plasma cutter, or a welder.

The transformer flux controller can be electrically connected between the primary controller and the at least two switch devices. In some embodiments, the transformer flux controller can be disposed within the primary controller.

In some embodiments, the at least two switch devices include at least one transistor switch that can provide a positive polarity transformer voltage and at least one transistor switch that can provide a negative polarity transformer voltage.

In some embodiments, the transformer flux controller can direct the switch devices to reverse the polarity of the transformer flux in response to detection of an onset of flux saturation in the high frequency transformer. In certain embodiments, the transformer flux controller can direct the switch devices to maintain the polarity of the transformer flux in an event an onset of flux saturation in the high frequency transformer is not detected.

In some embodiments, the primary controller can provide the drive signal as a pulse width modulated (PWM) drive signal having a beginning and an end. In certain embodiments, the transformer flux controller can reverse the polarity of the transformer flux prior to the end of the pulse width drive signal.

In some embodiments, the onset of flux saturation can be detected by monitoring an electrical current generated by the transformer and declaring the onset of flux saturation in an event the electrical current exceeds a predetermined threshold that is known to indicate the onset of flux saturation. In certain embodiments, in an event the onset of flux saturation is detected, the flux polarity in the transformer can be reversed by activating a switch that reverses the polarity of the transformer flux as it receives the drive signal within the transformer.

In certain embodiments, the drive signal can be a pulse width modulated (PWM) drive signal. The flux polarity in the transformer can be switched by activating the switch that reverses the polarity of the transformer flux prior to an end of duration of the drive signal.

Other aspects and advantages of the invention can become apparent from the following drawings and description, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

High frequency transformers, such as T1 transformers, are often prone to transformer flux saturation that can result in transformer damage, overheating, or shutdown. Certain embodiments disclosed herein address the problem of transformer flux control in a converter power circuit.

Figure 1A:
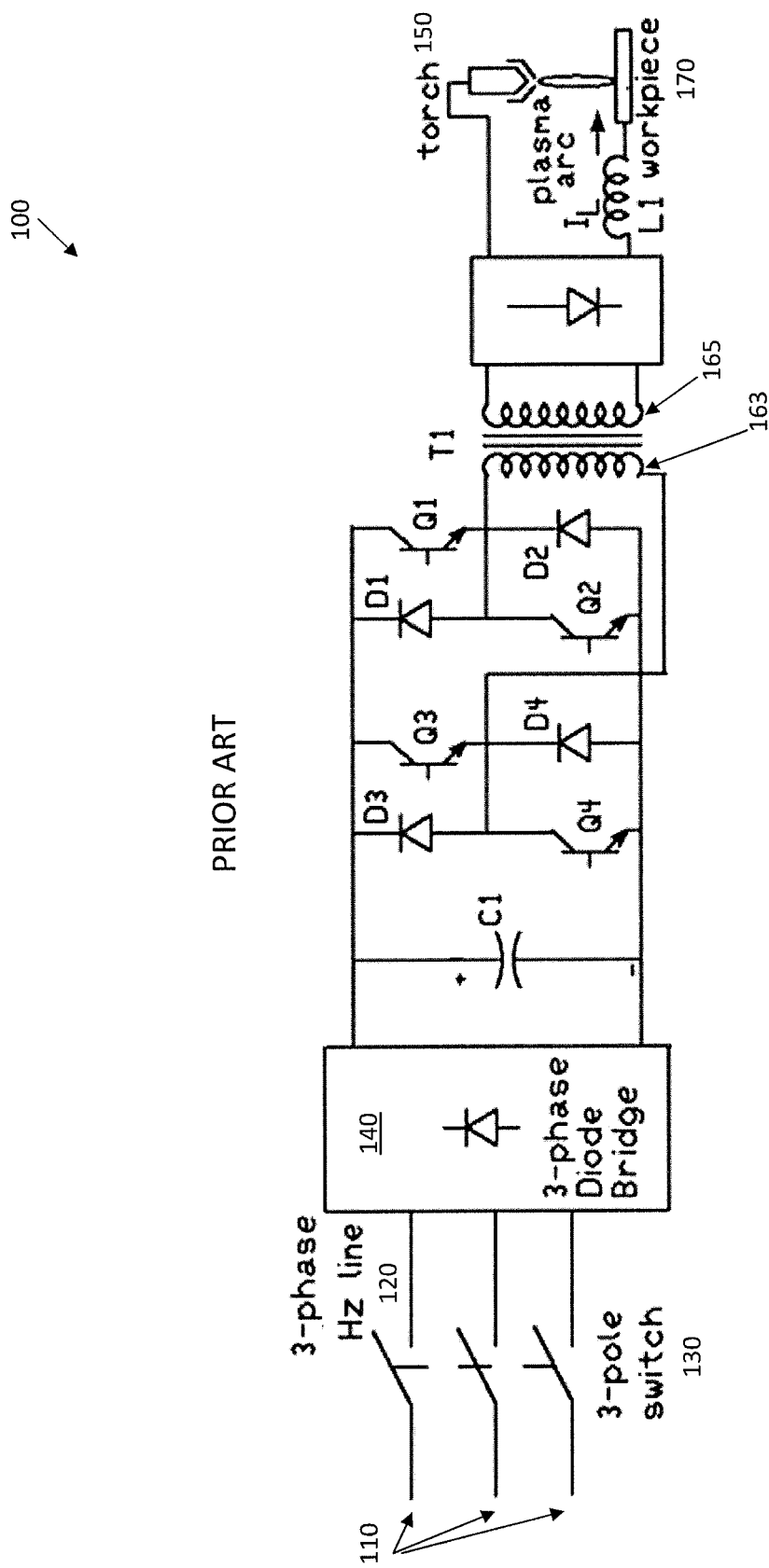
FIG. 1A is an illustration of a typical full-bridge DC-DC converter power circuit.

FIG. 1A is an illustration of a typical full-bridge DC-to-DC converter power circuit 100 that can be used for plasma-cutting operations on a work piece 170. The converter power circuit 100 typically includes a number of input AC terminals 110 that are connected to a three-phase line (e.g., 60-Hz/480-V three-phase line) 120 through a three-pole manual switch 130. The converter power circuit 100 can also include a front-end three-phase diode bridge 140 that is connected to a DC capacitor C1. In some implementations, a soft-start circuit (not shown) can be associated with the DC capacitor C1.

The converter power circuit 100 can further include a number of switches (e.g., Q1, Q2, Q3, and Q4), each of which can be connected to a corresponding anti-parallel diode (e.g., D1, D2, D3, and D4) across a DC bus. A high frequency transformer, T1, provides galvanic isolation between the incoming line 120 and the plasma torch 150 load. The T1 primary winding 163 is connected across the converter power circuit 100 output from AC terminals 110 of the three-phase full-bridge 140 and its secondary winding 165 is stepped down, full-wave rectified, and connected to the torch 150 load through an output filter inductor L1. An electrical current $I_L$ flows through the output inductor L1 to the plasma torch 150 and is used as the driving current of the plasma torch 150. In plasma cutting applications, the amount of the electrical current $I_L$ can be selected based on properties of the work piece 170, such as its material type or thickness. In some implementations, the amount of current $I_L$ can be controlled using a transformer current controller 101 (shown in FIG. 1B).

Figure 1B:
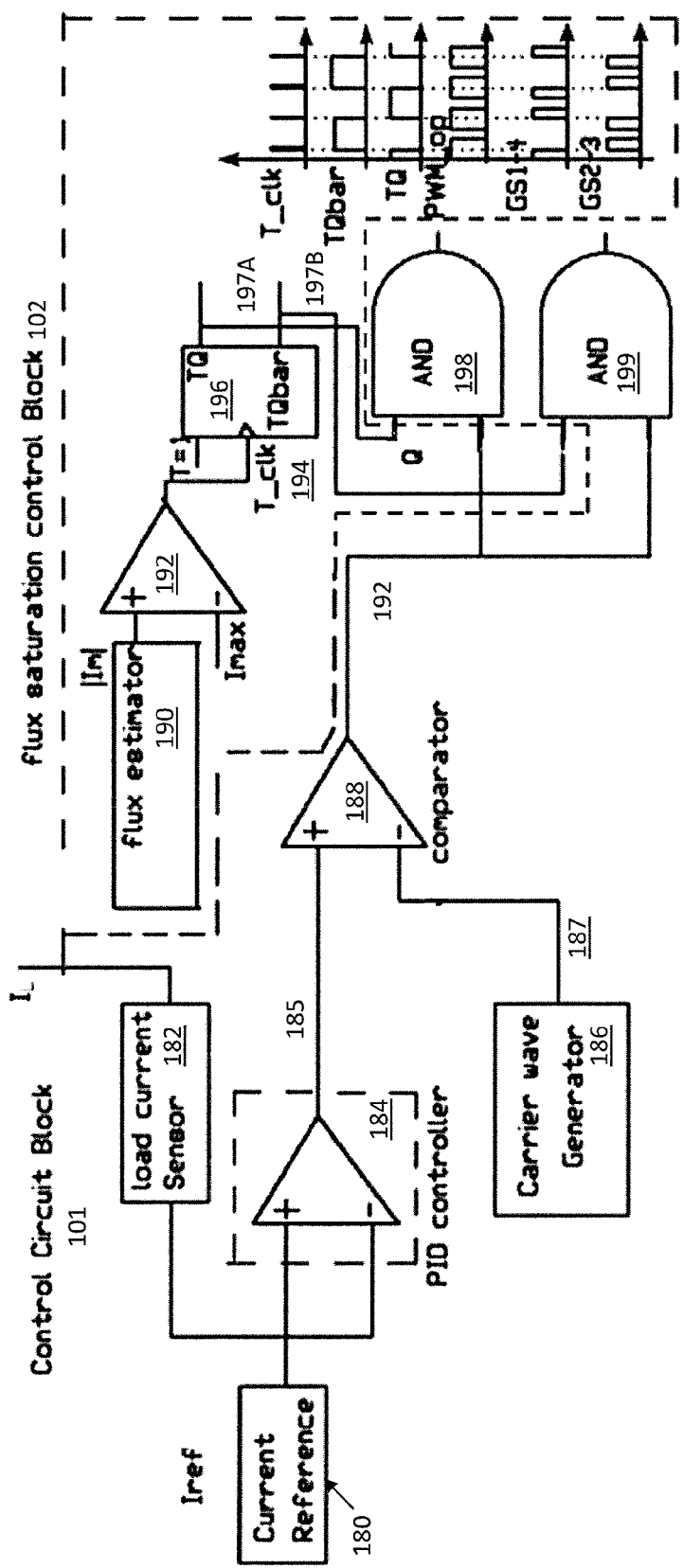
FIG. 1B is a block diagram of a transformer flux controller according to certain illustrative embodiments of the invention.

FIG. 1B is a block diagram of a transformer flux controller 102 according to some illustrative embodiments disclosed herein. The transformer flux saturation controller 102 can be coupled to a transformer control circuit block 101. In some embodiments, the transformer control circuit block 101 is used for controlling the operating plasma load current $I_L$.

In certain embodiments, a load current sensor 182 can be used to monitor the operating plasma load current $I_L$. Further, depending on the application at hand (for example, in a plasma cutting application, depending on material type or thickness of the work piece 170), a desired operating current amount (current reference) $I_{ref}$ can be considered.

A proportional-integral-derivative (PID) controller 184 can be arranged to receive the desired amount of operating current $I_{ref}$ and the actual operating current $I_L$, as measured by the load current sensor 182, and calculate an error value 185. The error value 185 indicates the difference between the measured value $I_L$ and the desired set point $I_{ref}$ and can be used to drive the control circuit block 101 to operate at current levels as close as possible to the optimal (reference) current $I_{ref}$.

The error value 185 is forwarded to a comparator 188 that compares the error value 185 to a primary drive signal 187 of the transformer (e.g., generated by a carrier wave generator 186) and creates a signal 192 that is used to drive the transformer 100 to output an electrical current signal having a value as close as possible to the optimal (reference) current $I_{ref}$.

In some embodiments, the flux saturation block 102 includes a flux estimator 190 that can monitor the flux in real-time. Flux monitoring can be done by sensing the currents (not shown) flowing on primary 163 and secondary 165 windings (FIG. 1A) of the transformer. In some embodiments, the current can be monitored by using a current transformer or Hall current sensors. In some embodiments, the transformer current $I_m$ can be calculated using the monitored current values while considering transformer primary 163 and secondary 165 windings turn ratios. In some embodiments, this calculated transformer current $I_m$ can be used as an indirect measurement of flux in a flux comparator 192 of the flux saturation control block 102.

In some embodiments, the transformer can be designed to operate with a maximum operating flux density $B_{max}$ (e.g., $B_{max}=0.25$ T) in a conventional control mode (e.g., at 25 kHz switching frequency). Using the core material flux density, B, versus its magnetic intensity, H, characteristics, the transformer magnetic length $l_e$ and primary turns $N_p$, the magnetizing current $I_m$ can be calculated. In some embodiments, the magnetic intensity, H, is calculated from the flux density, B, by determining:

$$H = 7.14e - 5e^{B/23.78} + 0.16572*B - 2.5649.$$

This expression can be obtained by curve fitting the material flux density, B, versus magnetic intensity, H, characteristic data using a least squares method. The transformer current $I_m$ can be then calculated from the magnetic intensity, H, by determining:

$$I_m = (H*l_e)/N_p.$$

The flux comparator 192 compares the transformer current $I_m$ with a reference (e.g., threshold) current $I_{max}$ that represents the current at which the transformer is considered as having reached saturation. Accordingly, in an event the transformer current $I_m$ exceeds the reference current $I_{max}$, the flux comparator 192 declares that the onset of flux saturation is detected. In response to detection of the onset of flux saturation, the flux comparator 192 generates a clock pulse 194 for a switch-steering circuit 196 of the flux saturation control block 102.

A switch-steering circuit 196 of the flux saturation control block 102 can receive the clock pulse 194 generated by the flux comparator 192. In some embodiments, the switch-steering circuit 196 can be made up of a T flip-flop (T-FF) and a number of (e.g., two) logical AND gates 198, 199. In response to the clock pulse 194, the switch-steering circuit 196 updates a switch steering flag 197A, 197B. The switch steering flag 197A, 197B, in turn, activates an appropriate logical AND gate 198, 199. The activated AND gate 198, 199, accordingly, steers the drive signal 192 to an appropriate switch (e.g., Q1 and Q4 or Q2 and Q3) based on the T-FF output 197A, 197B. Specifically, the flag 197A, 197B triggering and logical AND gate 198, 199 activation is done such that upon detection of the onset of flux saturation, the AND gate 198, 199 that triggers appropriate switches (e.g., Q1, Q2, Q3, and Q4) for reversing the polarity of transformer flux (or transformer voltage) 192 is activated. Similarly, as long as an onset of flux saturation is not detected, the flag 197A, 197B triggering and logical AND gate 198, 199 activation is done to ensure that the AND gate 198, 199 that triggers appropriate switches (e.g., Q1, Q2, Q3, and Q4) for maintaining the polarity of transformer flux 192 is activated.

The switch-steering circuit 196 can use the flux-saturation clock pulse 194 to reverse the flux direction by steering the incoming drive signal 192 from a current switch pair (e.g., Q1 and Q4) to a switch pair having reverse polarity (e.g., Q2 and Q3) or vice-versa. For example, if prior to detection of the onset of flux saturation, the drive signal 192 is being received by the switches that provide the plasma arc torch 150 with positive polarity voltage, upon detection of onset of flux saturation, the drive signal 192 is received by the switches that provide the plasma arc torch 150 with negative polarity voltage. Similarly, if prior to detection of the onset of flux saturation, the drive signal 192 is being received by the switches that provide the plasma arc torch 150 with negative polarity voltage, upon detection of onset of flux saturation, the drive signal 192 is received by the switches that provide the plasma arc torch 150 with positive polarity voltage.

In some embodiments, a pulse width modulation (PWM) average-current-mode control method is used by control block 101 to control the load current $I_L$. The flux saturation control block 102 alternately operates the switches (e.g., switch pairs Q1-Q4 and Q2-Q3) in situations where the onset of flux saturation is detected during a PWM drive signal period.

In some embodiments, if an onset of flux saturation is not detected (e.g., as long as the transformer current $I_m$ does not exceed the reference current $I_{max}$), the clock pulse 194 is not changed and the flux saturation control block 102 continues to maintain the drive signal 192 at switches that are used at the time the transformer current $I_m$ is measured.

Certain embodiments control the transformer flux by steering the drive signal 192 of the transformer to an appropriate switch (e.g., switch pairs Q1-Q4 and Q2-Q3) without affecting the main control loop of the transformer. This can enable full utilization of the transformer core without compromising the system dynamic response. Furthermore, certain embodiments disclosed herein can be retrofitted into an existing power supply with minimal impact on its circuitry. Since the main control loop is left unaffected, embodiments disclosed herein can be used in a variety of applications, whether voltage or current controlled, and in converter topologies, such as the push-pull as well as the full bridge. Accordingly, the transformer flux can be controlled without affecting the dynamics of the main control loop of the transformer. In some embodiments, the converter switching frequency for power levels in the 5 kW to 30 kW range can be generally in the 15 kHz to 100-kHz range. In some embodiments, the converter switching frequency can be determined based on the carrier wave frequency of the drive signal 192.

Figure 1C:
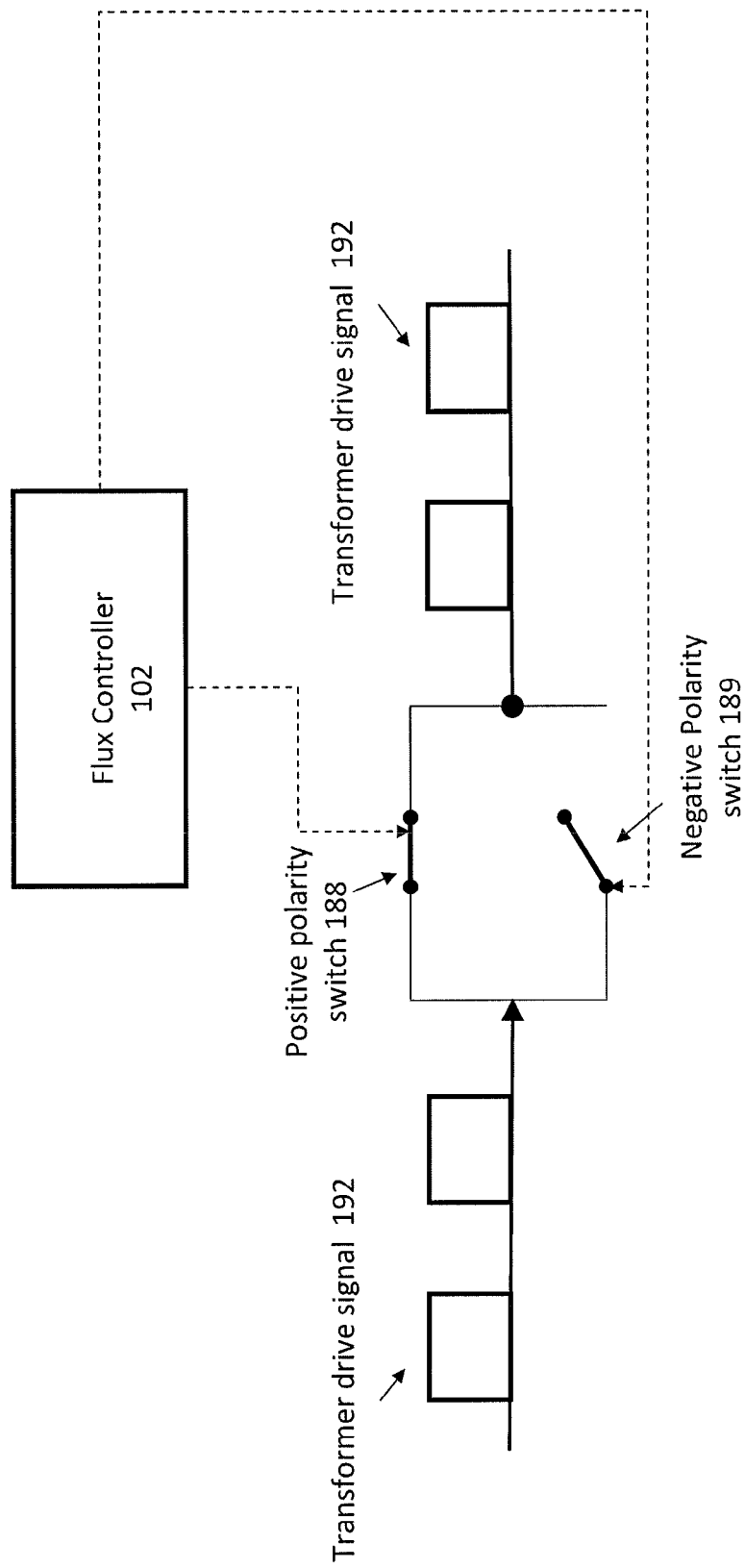
FIG. 1C is a high-level block diagram of a flux controller according to certain illustrative embodiments of the invention.

FIG. 1C is a high-level block diagram of a flux controller 102 according to some illustrative embodiments of the invention. As illustrated, the flux controller 102 monitors the flux in the transformer (not shown) to determine if an onset of flux saturation is detected. For example, in some embodiments, the amount of flux in the transformer can be compared against a flux threshold that indicates the onset of flux saturation and if the amount of flux exceeds the threshold, the onset of flux saturation is declared. In some embodiments, flux saturation can be detected by monitoring the current flowing through the transformer (e.g., current $I_L$ shown in FIG. 1A) and comparing the current against a threshold that indicates the onset of flux saturation. Other flux saturation determination schemes known in the art can be used.

Depending on whether or not the onset of flux saturation is detected, the flux controller 102 directs the transformer drive signal 192 to an appropriate switch 188, 189. For example, if a switch providing positive polarity 188 transformer signal (e.g., transformer voltage or transformer voltage) is being used and the onset of flux saturation is not detected, the transformer drive signal 192 continues to be directed through the present switch 188. However, if a switch providing negative polarity 189 voltage to the transformer is being used before the onset of flux saturation is detected, the transformer drive signal 192 is directed (from the negative polarity switch 189) to a switch providing an opposite polarity signal (e.g., positive polarity switch 188).

Figure 2A:
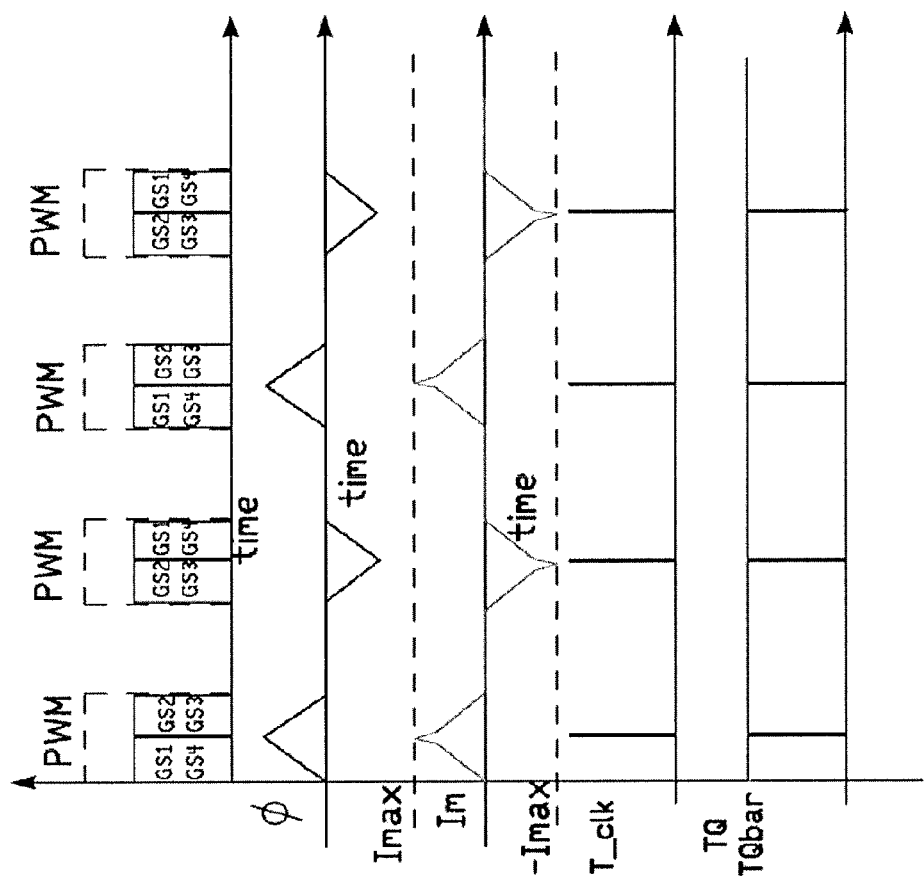
FIG. 2A is a graphical representation of various transformer signals according to certain embodiments described herein.

FIG. 2A is a graphical representation of various transformer signals according to some embodiments described herein. As shown, in some embodiments, flux saturation can be detected by monitoring the current flowing in the transformer $I_m$ over time and determining whether the current has reached a maximum level $I_{max}$. If the current is less than its maximum level $I_{max}$ (i.e., $I_m < I_{max}$) the clock signal is maintained at its present value (e.g., zero). However, once the current reaches its maximum value $I_{max}$ (i.e., $I_m \geq I_{max}$), the clock signal T_clk, is activated (e.g., set to one).

The saturation of flux (peak points in flux Ø) can be reached at any point during the duty cycle of a drive signal, for example a PWM signal. As noted, the clock signal, T_clk, is activated (e.g., T_clk=1) in response to the flux reaching the saturation point. The activation of the clock signal toggles the steering flip-flop outputs TQ and TQbar and changes the polarity of the flux. Once the flux polarity is reversed, flux is once again monitored to determine if a saturation point has been reached. In some embodiments, the clock signal T_clk can be reset (e.g., T_clk=0) once the direction of flux is reversed.

The polarity changing switch pulse can include multiple fractional pulses depending on the number of times that flux saturation has been reached during its duty cycle. In the example shown in FIG. 2A, the PWM signal includes two consecutive fractional polarity changing switch pulses. This corresponds to flux saturation being reached once during its duty cycle and the polarity changing switches (e.g., Q1 and Q4 or Q2 and Q3) having switched the polarity of the flux Ø during the duty cycle of the PWM signal. In some embodiments, the polarity changing switches can be activated to switch flux polarity multiple times if multiple flux-saturation events are detected in one PWM pulse period.

In contrast to conventional flux control methods that tend to steer a signal (PWM pulse) at the end of the carrier wave signal, some embodiments disclosed herein can steer signal transfer at any point within the PWM pulse signal at the instant of flux saturation. Further, in contrast to conventional methods that provide for one pulse switch during carrier cycle of a PWM pulse, some embodiments disclosed herein can include whole and/or fractional PWM pulses per switching period. Furthermore, the switching frequency of some embodiments of the present invention can be equal to or greater than the carrier frequency and can vary with load and line operating conditions, whereas the switching frequency of the conventional methods can be constant throughout an entire operating range.

As shown in FIG. 2A, certain embodiments can maintain a control of flux in the transformer without affecting the load current control dynamics. Both the flux and load current $I_L$ are controlled independently without any undesirable cross-coupling between the flux and the load current.

Figure 2B:
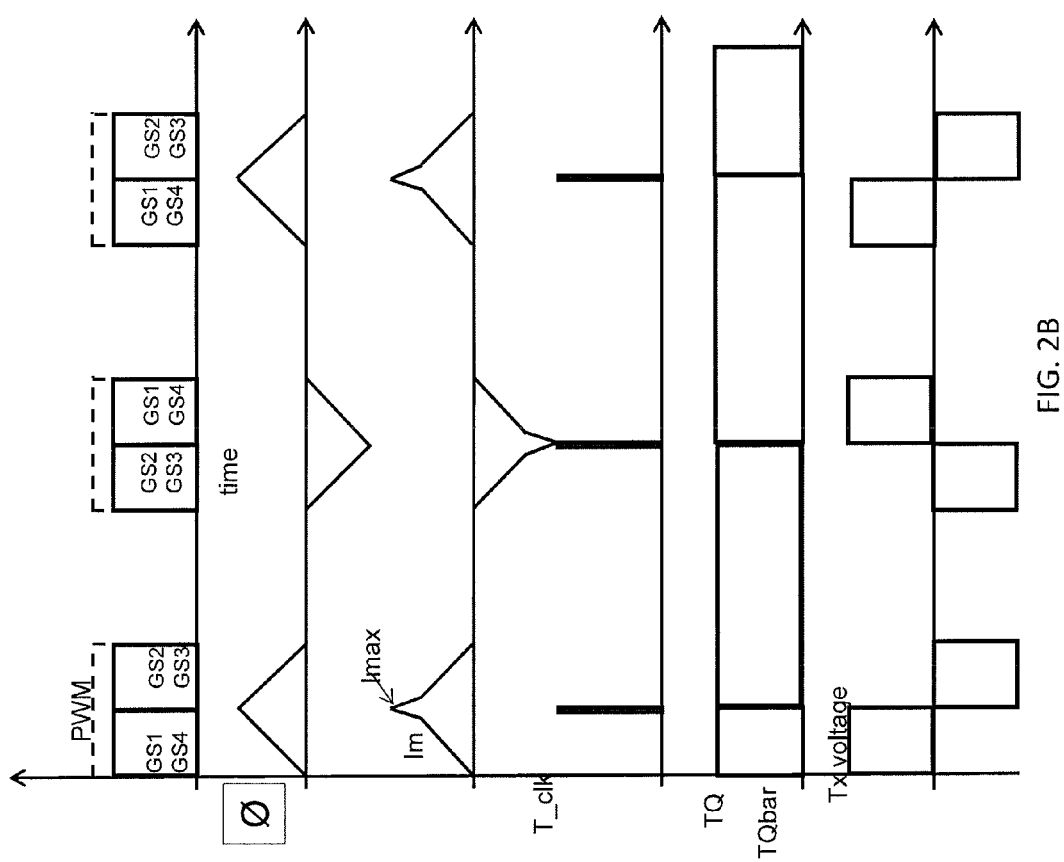
FIG. 2B is a graphical representation of various transformer signals according to certain embodiments described herein.

FIG. 2B is a graphical representation of various transformer signals according to some embodiments described herein. Similar to the example presented in FIG. 2A, a clock signal T_clk is activated in response to detection of onset of saturation in the transformer. Flux saturation can be detected by monitoring the current $I_m$ and determining whether the current has reached a maximum value $I_{max}$ indicating flux saturation. In some embodiments, as long as $I_{max}$ is not reached, no action is taken. If $I_{max}$ is reached, flux saturation (indicated by the peak point in the graph of Ø) is declared and a clock signal T_clk is activated. The activation of the clock signal T_clk, in turn, activates the T flip-flop circuit 196 of the flux saturation block 102 (shown in FIG. 1B) and results in switching of the polarity changing switches and the reversal of the flux polarity. As shown in FIG. 2B, this can occur at any point during the carrier cycle of the PWM pulse. For example, the flux direction can be reversed such that the PWM signal includes multiple (two) consecutive fractional polarity changing switch pulses.

Figure 3:
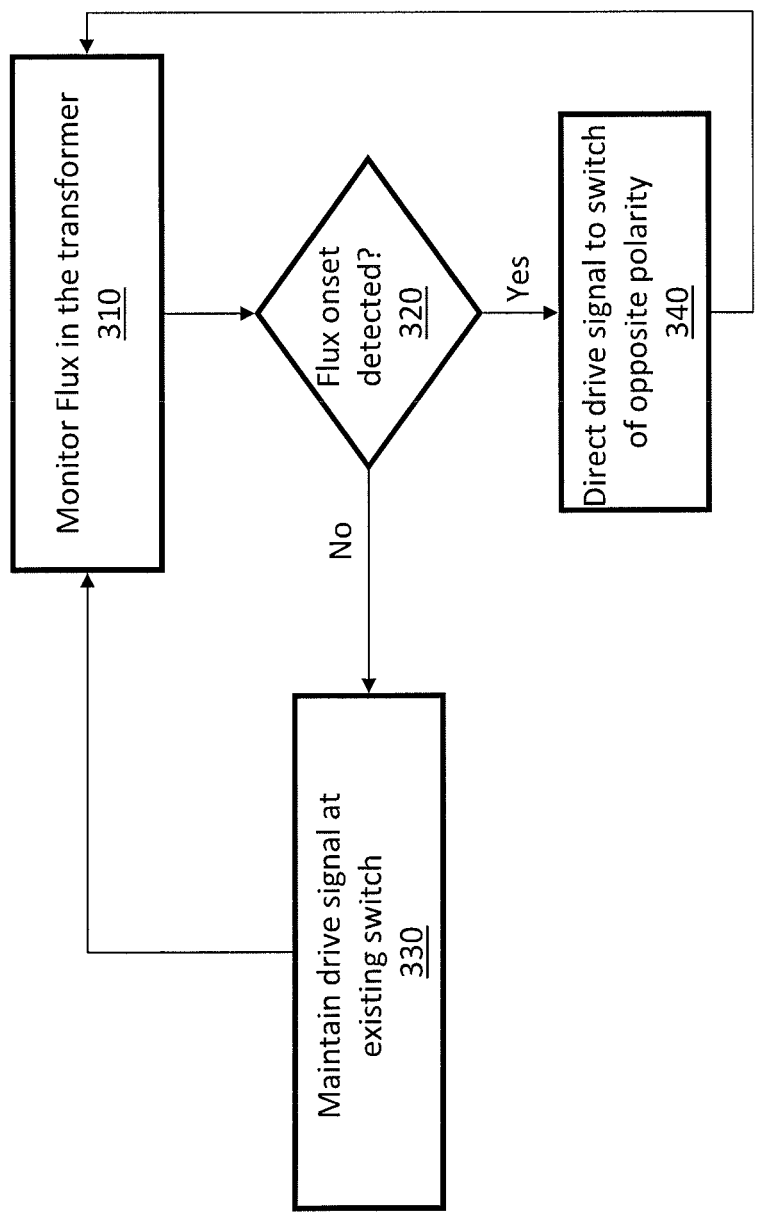
FIG. 3 is a flow diagram of procedures for controlling transformer flux according to certain embodiments of the present invention.

FIG. 3 is a flow diagram of procedures for controlling transformer flux according to embodiments of the present invention. The amount of flux in the transformer is monitored (block 310) to determine if an onset of flux saturation in the transformer is detected (block 320). If an onset of flux saturation in the transformer is detected, the drive signal of the transformer is directed to a switch that provides a voltage having opposite polarity to the polarity of the existing voltage of the transformer (block 340). If an onset of saturation is not detected, the drive signal of the transformer is maintained to ensure that it is directed to the switch (or switches) that provide the transformer with its current operating voltage (block 320).

While the invention has been particularly shown and described with reference to specific illustrative embodiments, it should be understood that various changes in form and detail may be made without departing from the spirit and scope of the invention.

What is claimed is:

1. A high frequency transformer link converter comprising:
   a high frequency transformer;
   a primary controller arranged to provide a pulse width modulated (PWM) drive signal to the high frequency transformer;
   at least two switch devices arranged to receive the PWM drive signal within the high frequency transformer, at least one of the switch devices being arranged to reverse a polarity of transformer flux; and
   a transformer flux controller, coupled to the at least two switch devices and uncoupled from the primary controller, the transformer flux controller arranged to steer the PWM drive signal to direct the switch devices to maintain or reverse the polarity of the transformer flux in response to detection of an onset of flux saturation in the high frequency transformer.

2. The high frequency transformer link converter of claim 1 wherein the high frequency transformer is coupled to at least one of a thermal processing unit, a plasma cutter, or a welder.

3. The high frequency transformer link converter of claim 1 wherein the transformer flux controller is electrically connected between the primary controller and the at least two switch devices.

4. The high frequency transformer link converter of claim 1 wherein the transformer flux controller is disposed within the primary controller.

5. The high frequency transformer link converter of claim 1 wherein the at least two switch devices include at least one transistor switch providing a positive polarity transformer voltage and at least one transistor switch providing a negative polarity transformer voltage.

6. The high frequency transformer link converter of claim 1 wherein the transformer flux controller is arranged to direct the switch devices to maintain the polarity of the transformer flux in an event an onset of flux saturation in the high frequency transformer is not detected.

7. The high frequency transformer link converter of claim 1 wherein the primary controller is arranged to provide the drive signal as a pulse width modulated (PWM) drive signal having a beginning and an end.

8. The high frequency transformer link converter of claim 6 wherein the transformer flux controller is arranged to reverse the polarity of the transformer flux prior to the end of the pulse width drive signal.

9. A method for controlling flux saturation in a high frequency transformer, the method comprising:
   providing a pulse width modulated (PWM) drive signal to the transformer;
   monitoring flux saturation in the transformer; and
   maintaining flux polarity in the transformer, until an onset of flux saturation is detected, by activating a switch that maintains the flux polarity as it receives the PWM drive signal within the transformer.

10. The method of claim 9 further including monitoring an electrical current generated by the transformer and detecting the onset of flux saturation in an event the electrical current exceeds a predetermined threshold indicating the onset of flux saturation.

11. The method of claim 9 further including reversing the flux polarity in the transformer, in an event the onset of flux saturation is detected, by activating a switch that reverses the flux polarity as it receives the drive signal within the transformer.

12. The method of claim 11 wherein the drive signal is a pulse width modulated (PWM) drive signal and wherein reversing the flux polarity in the transformer includes activating the switch that reverses the flux polarity in the transformer prior to an end of duration of the drive signal.

13. A flux saturation controller comprising:
   a switch electrically connected to a primary controller of a high frequency transformer, the switch arranged to receive a pulse width modulated (PWM) drive signal, provided by the primary controller, within the high frequency transformer, and maintain or reverse flux polarity in the high frequency transformer; and
   a flux saturation monitor, electrically connected to the switch, the flux saturation controller arranged to monitor the high frequency transformer to determine if an onset of flux saturation in the transformer is detected and steer the PWM drive signal to direct the switch to maintain or reverse the flux polarity of the high frequency transformer.

14. The flux saturation controller of claim 13 wherein the flux saturation monitor is arranged to monitor an electrical current generated by the transformer and direct the switch to reverse the flux polarity of the high frequency transformer in an event the electrical current exceeds a predetermined threshold indicating the onset of flux saturation.

15. The flux saturation controller of claim 13 wherein the flux saturation monitor is arranged to monitor an electrical current generated by the transformer and direct the switch to maintain the flux polarity of the high frequency transformer in an event the electrical current does not exceed a predetermined threshold indicating the onset of flux saturation.

16. The flux saturation controller of claim 13 wherein the drive signal is a pulse width modulated (PWM) drive signal.

17. The flux saturation controller of claim 13 wherein the switch is arranged to reverse the flux polarity of the high frequency transformer prior to an end of duration of the drive signal.

18. The flux saturation controller of claim 13 wherein the transformer flux controller is electrically connected between the primary controller and the switch.

19. The flux saturation controller of claim 13 further including at least two switches arranged to maintain or reverse the flux polarity of the high frequency transformer, at least one of the switches being arranged to reverse the flux polarity of the high frequency transformer.

* * * * *